United States Patent [19]
Chana et al.

[11] 4,030,014
[45] June 14, 1977

[54] CURRENT-TO-CURRENT ELECTRICAL ISOLATOR

[75] Inventors: Maghar S. Chana, Rochester; Eli Leonard Garelick, Henrietta, both of N.Y.

[73] Assignee: Rochester Instrument Systems, Inc., Rochester, N.Y.

[22] Filed: Apr. 25, 1975

[21] Appl. No.: 571,586

[52] U.S. Cl. .............................. 321/2; 321/27 MS; 331/47; 331/52
[51] Int. Cl.² ........................................ H02M 3/335
[58] Field of Search ................ 321/27 MS, 45 R, 2, 321/16–18; 331/113 R, 47, 50, 52

[56] References Cited
UNITED STATES PATENTS

| | | | |
|---|---|---|---|
| 3,344,335 | 9/1967 | Walker | 321/45 R X |
| 3,526,823 | 9/1970 | Genuit | 321/45 R X |
| 3,571,692 | 3/1971 | Andrew | 321/27 MS X |
| 3,794,907 | 2/1974 | Fucito | 321/45 R X |

*Primary Examiner*—Gerald Goldberg
*Attorney, Agent, or Firm*—Eliot S. Gerber

[57] ABSTRACT

A current-to-current isolator is utilized in a monitoring system between a signal transmitter and a control room instrument. The isolator has a master oscillator, including a first transformer, a slave oscillator, a current transformer and a rectifying circuit, so that the current signal at its input is closely reproduced at its output. The isolator is powered by the signal current from the transmitter and does not require an external power source.

7 Claims, 4 Drawing Figures

CURRENT-TO-CURRENT ELECTRICAL ISOLATOR

BACKGROUND OF THE INVENTION

The present invention relates to monitoring systems and more particularly to a current-to-current electrical signal isolator for use in such systems.

In a process plant, such as an oil refinery or an atomic reactor facility, a large number of process variables are simulataneously monitored by the operating personnel. For example, such a process plant may have hundreds of sensing transducers, such as temperature responsive thermocouples, which constantly monitor various portions of the processes. Information from the sensing transducers, in the form of electrical signals, is communicated to one or more locations where they may be connected to various monitoring instruments. For example, the signals from the various sensors may be communicated to a central control room and utilized in control room instruments such as meters, chart recorders, controllers, computers or annunciator warning devices.

At the present time, in one type of monitoring system utilized in a process plant, each transducer is connected by wires to a transmitter. The transmitter is connected to a power source and is also connected, by output wires, to the control location. It frequently occurs that one or more electrical groundloop problems occur when the transmitters are connected to the control room instruments. One possible problem arises when more than one control room instrument is connected to a single transmitter. For example, a chart recorder and an analog-to-digital convertor may both be desired to be connected to a single transmitter so that both receive information from the same sensor. If one of the control room instruments, such as the analog-to-digital convertor, is connected to ground, then errors in measurement may result. The control room instruments may be grounded, because they operate from 24 volts direct current, or as a safety measure. Another problem is that the sensing transducer may be grounded; for example, some thermocouples are purposely grounded to improve their mechanical stability and others become grounded after they age or become damaged. Still another problem is that there is a lack of standardization as to the ground connections of the control room instruments; some may be positive ground, others may be negative ground, and still others may have an intermediate goround potential. The manufacturer of the control room instrument may not state the exact ground required by the instrument, or the instructions may be lost, so that the grounding problem may not be recognized until the instrument is fully connected. Any of these differences in ground potential between the sensors or transmitters and the control room instruments may cause circulating currents which disturb and distort the signals received by the control room instruments.

It is known that a solution to the grounding problems which may occur in a process monitoring system may be obtained by utilizing a current-to-current isolator. If the current-to-current isolators are incorporated into the transmitters then they may derive their operating power from the same source as the transmitter. However, to use a current-to-current isolator which each transmitter is economically unjustified in many situations. A process plant may have hundreds of transmitters and there may be ground potential problems in only a few of their loops; for example, problems may occur in only 10% of the transmitter loops. The other transmitter loops may not present any grounding problems, although their sensor or control room instrument is grounded, because the control room instrument is physically close to the sensing transducer and consequently there may not be appreciable ground potential differences. In that situation the current-to-current isolators in 90% of the transmitters would serve no useful function and yet they would add to the cost and size of all of the transmitters.

It is presently known that the preferred solution to grounding problems in a process plant monitoring system is the use of separate current-to-current isolators. Such current-to-current isolators may be utilized in only those transmitter loops which present grounding problems or otherwise require electrical isolation. Presently, such isolators are powered by the plant power lines, usually, in the United States, a 110-volt a.c. line, and include a power regulator and separate input and output amplifiers. However, due to the relatively high cost of skilled electrical labor, it may be relatively expensive to connect the isolator to the power line, for example, because the isolator may be far from a power line or otherwise inconveniently located. In addition, such current-to-current isolators are expensive and are relatively bulky, for example, over 100 cubic inches, which may present problems in mounting them in a convenient location. Generally such isolators are "retrofitted", i.e., utilized in existing installations.

SUMMARY OF THE INVENTION

The present invention is of a current-to-current isolator which is particularly adapted for use in connection with a transmitter and a control room instrument. The transmitter communicates a signal based upon information obtained from a sensing transducer connected to the transmitter and the transmitter's signal is in the form of a current which varies between a specified standard, for example, 4 through 20 milliamps. The transmitter is connected to the input terminals of the current-to-current isolator and the output terminals of the current-to-current isolator are connected to one or more control room instruments.

The current-to-current isolator of the present invention includes the two input terminals, which are connected to the transmitter, and the two output terminals connected to the control room instrument, and does not include connections to a separate power source. An exterior power supply is not required because the isolator of the present invention operates directly from the input signal and in that sense is self-powered. The circuit of the current-to-current isolator of the present invention includes a master oscillator which is a chopper, i.e., a free-running astable multivibrator which is self-oscillating and which, in the preferred embodiment, utilizes two transistors, two capacitors, two resistors and one transformer. The master oscillator is connected to the primary of a first transformer and the secondary of the first transformer is connected in the circuit of a slave oscillator (current modulator). The slave oscillator, in the preferred embodiment, is a precision chopper which includes two transistors which present a push-pull output, a capacitor, the secondary winding of the first transformer and a current transformer. A tap of the current transformer is connected directly to one of the input terminals. The output of the current transformer (second transformer) is demodulated and rectified by means of two diode rectifiers and the gain of the current demodulator is calibrated by means of an adjustable potentiometer and the output is filtered by a capacitor. The number of turns of the current transformer may be varied to present a scale factor between the input and the output of the isolator. If there is a one-to-one ratio of turns, then there will be a one-to-one ratio of input current to output current. However, the ratio of turns may be varied to provide a current isolator which will match the needs of the overall system.

OBJECTIVES OF THE INVENTION

It is an objective of the present invention to provide a current-to-current isolator which will prevent adverse effects resulting from the grounding of sensors or control room instruments and will be powered from the transmitter.

It is a further objective of the present invention to provide a current-to-current isolator which will be extremely compact in size and which will be a separate unit for ready incorporation into a system.

It is a further objective of the present invention to provide a current-to-current isolator which will be relatively inexpensive in cost and without a power regulator and without separate input and output amplifiers.

It is a further objective of the present invention to provide a current-to-current isolator which will provide a relatively high degree of linearity, of the order of 0.05%, as between the input current from the transmitter and the output current from the isolator.

It is a further objective of the present invention to provide a current-to-current isolator which will provide a relatively high repeatability, in the order of at least 0.05%, as between signals.

It is a further objective of the present invention to provide a current-to-current isolator which will prevent, to a considerable extent, adverse effects, such as errors in signal transmission, from long-term aging and from short-term environmental effects such as temperature changes.

It is a feature of the present invention to provide a current-to-current isolator which is a four terminal device having two input terminals and two output terminals and which is self-powered by the input signal. The isolator has multivibrator means to chop the input signal into positive and negative directed waveforms and a current transformer having a primary winding with at least three taps and a secondary winding. The primary winding of the current transformer is connected to the multivibrator means and to one of said input terminals and a rectifying means is connected to said secondary winding to rectify and filter the current and the rectifying means is connected to the output terminals.

It is a further feature of the present invention that the isolator includes a second multivibrator means whose frequency controls the first multivibrator means.

It is a still further feature of the present invention to provide a current-to-current isolator adapted to be utilized between a transmitter and a control room instrument and to be powered by the current signal from the transmitter and without another power source. The isolator comprises a pair of input terminals and a pair of output terminals; a master oscillator means which is a push-pull chopper and connected to the first input terminal; a first transformer whose primary winding has a center tap and two end taps; a voltage reference means providing a voltage drop connected between the first input terminal and the center tap, the center tap and the end taps being connected to the master oscillator; a slave oscillator means connected to the secondary of the first transformer and whose frequency is controlled by the master oscillator; a current transformer whose primary winding has a center tap and two end taps, the center tap being connected to the second input terminal and the end taps being connected to said slave oscillator means; and full wave rectifying and filtering means which is connected between the secondary of said current transformer and said output terminals. Preferably, as a feature thereof, the master oscillator means is a free-running astable multivibrator which operates using the primary winding of said first transformer and has an about 50% duty cycle and the voltage reference means is a series of diodes.

BRIEF DESCRIPTION OF THE DRAWINGS

Other objectives and features of the present invention will be apparent from the following detailed description presenting the best mode contemplated by the inventors of carrying out their invention, which should be taken in conjunction with the accompanying drawings.

In the drawings.

DETAILED DESCRIPTION OF THE INVENTION

Figure 1:
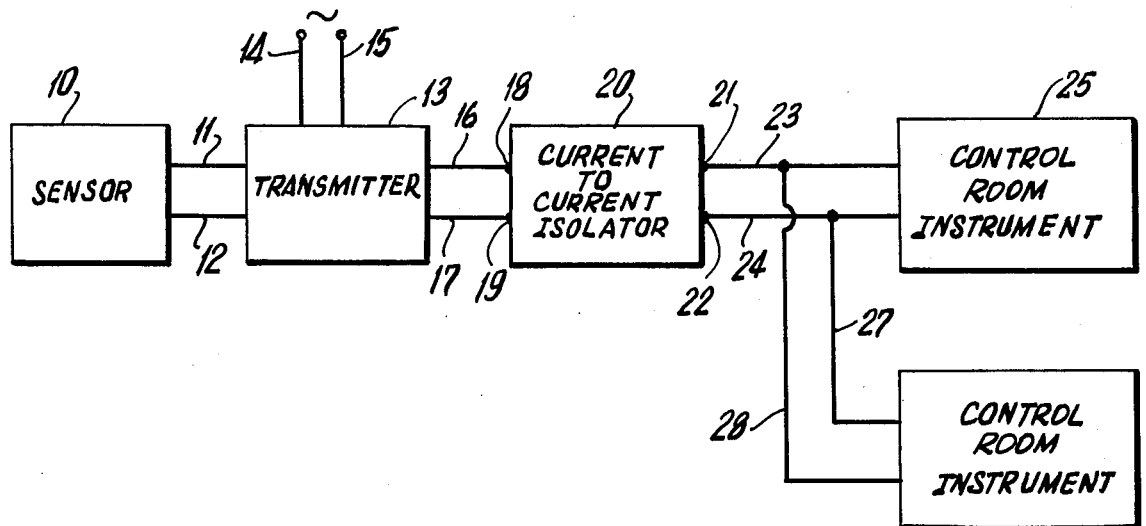
FIG. 1 is a schematic diagram illustrating the field of use of the current-to-current isolator of the present invention.

As shown in FIG. 1, the current-to-current isolator of the present invention is particularly adapted for use in a sensor monitoring system, for example, in a process plant. In that environment a sensing transducer 10 (sensor) is connected by wires 11 and 12 to a transmitter 13. The sensing transducer 10, for example, may be a grounded or ungrounded thermocouple. The transmitter may be of the conventional type which operates from the power line of the plant. Generally in the United States the industry standard is that the transmitter will produce a signal which is a current signal in the 4 through 20 milliamp range. However, there are older types of transmitters, as well as transmitters used in other countries, which produce current signals in other ranges, for example, 10 through 50 milliamps or 1 through 5 milliamps.

The transmitter 13 receives its power through the electrical power lines 14 and 15. The output of the transmitter 13 is to the wires 16 and 17 which run to the central control location, for example, the control room, of a process plant. The wires 16 and 17 are connected to the input terminals 18 and 19 of the current-to-current isolator 20 of the present invention. The output terminals 21 and 22 of the current-to-current isolator 20 are connected by wires 23 and 24 to the control room instrument 25. Additional wires 28 and 27 connect the output terminals 21 and 22 of the isolator to a second control room instrument 26.

Although FIG. 1 shows two control room instruments connected to the signal isolator, it will be understood that one instrument may be so connected and, within the limitations of the input impedance of other control room instruments, more than two control room instruments may be connected to the output of the same isolator.

Figure 2:
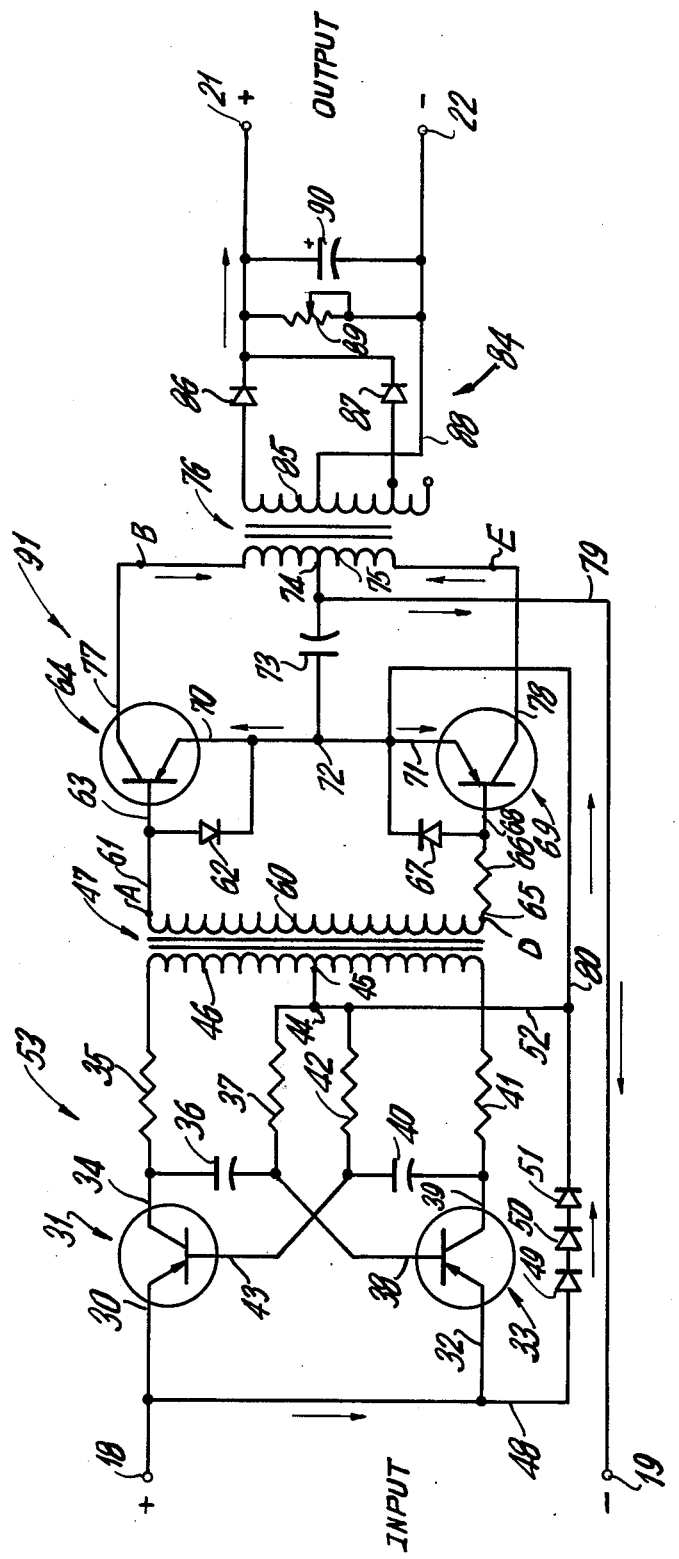
FIG. 2 is a schematic electrical circuit diagram of the circuitry of the current-to-current isolator of the present invention.

The circuit of the preferred embodiment of the current-to-current isolator is shown in FIG. 2. The first input terminal 18 is shown as receiving a positive input and the other input terminal 19 is shown as receiving a negative of the input current. The input terminal 18 is connected to the emitter 30 of the first transistor 31 and is also connected to the emitter 32 of the second transistor 33. The collector 34 of the first transistor 31 is connected to one side of the resistor 35 and to one side of the capacitor 36. The opposite side of the capacitor 36 is connected to one end of the resistor 37. Also, the opposite side of the capacitor 36 is connected to the base 38 of the second transistor 33.

Similarly, the collector 39 of the second transistor 33 is connected to one side of the capacitor 40 and also to one side of the resistor 41. The opposite side of the capacitor 40 is connected to one side of the resistor 42 and also to the base 43 of the transistor 31. Those ends of the respective resistors 37 and 42 which are not connected to the respective capacitors 36 and 40 are connected together and their common connection point 44 is connected to a tap 45 at the mid-point of the primary winding 46 of the transformer 47. The resistor 35 is connected to a tap at one end of the primary winding 46 and the resistor 41 is connected to a tap at the opposite end of the primary winding 46. The input terminal 18 is connected through line 48 to a string of three diodes 49, 50 and 51. The cathode of the last diode 51 is connected through line 52 to the connection point 44 which is in turn connected to the tap 45 of the primary winding 46.

The circuitry so far described constitutes a master oscillator 53 (chopper), whose preferred rate of oscillation is 5 khz, although its rate of operation is not critical to the operation of the current-to-current isolator. The three diodes 49, 50 and 51 form a voltage reference (constant voltage shunt) which effectively develops a ground potential for the oscillator 53 in order to start and drive the master oscillator. The diodes 49, 50 and 51 are not critical but preferably they develop 2 volts across the chain of three diodes. Alternatively, other voltage reference means may be used, such as a Zener diode. A resistor, although it will develop a sufficient voltage drop, is not preferred as it would waste loop drive capability of the transmitter.

The secondary winding 60 of transformer 47 has a top tap 61 and a bottom tap 65. The top tap 61 is connected to the anode of a diode 62 and also to the base 63 of a transistor 64. As shown, all four transistors are of the PNP type. The bottom tap 65 of the secondary winding 60 is connected to one side of the resistor 66 whose other side is connected to the anode of the diode 67 and the base 68 of the transistor 69. The emitters 70 and 71 of the respective transistors 64 and 69 are connected together at a connection point 72 which connection point 72 is also connected to the cathode of the diode 62. The connection point 72 is connected to one side of the capacitor 73 whose other side is connected to a tap 74 which is at the mid-point of the primary winding 75 of the current-to-current transformer 76. The collector 77 of transistor 64 is connected to the top tap of the primary winding 75 and the collector 78 of transistor 69 is connected to the bottom tap of the primary winding 75. The mid-point tap 74 of the primary winding 75 is connected through line 79 to the input terminal 19. A line 80 connects the chain of three diodes 49, 50 and 51 to the connection point 72.

A secondary winding 85 of the current-to-current transformer 76 has three out of four taps connected to the current demodulator (rectifier) 84. Its top tap is connected to the anode of the rectifying diode 86, its bottom tap is connected to the anode of the rectifying diode 87, and its mid-point tap is connected to a line 88. The line 88 is connected to one side of the adjustable resistor (potentiometer) 89 and to one side of the capacitor 90 and also to the negative output terminal 22. The cathodes of the diodes 86 and 87 are connected to the opposite terminal of the potentiometer 89 and to the opposite side of the capacitor 90 and to the positive output terminal 21.

Figure 3:
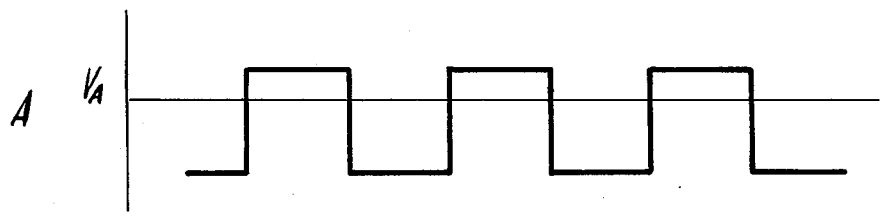
FIG. 3 is a diagram illustrating the wave forms of the voltage measured against time at point A in the circuit of FIG. 2.
Figure 4:
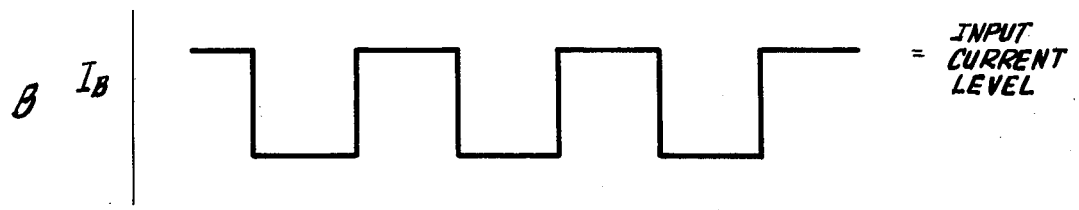
FIG. 4 is a diagram of the current measured against time on the same scale as that of FIG. 3 and taken at point B of the circuit of FIG. 2.

As shown in FIG. 3, the output point A of the master oscillator has a voltage wave form which is close to a 50% duty cycle square-wave form, although that wave form is not critical. As shown in FIG. 4, the current output of the slave (current) modulator 91, when viewed at its point B, is also of square form and opposite in sign compared to the voltage wave form at point A. However, the frequency of the wave forms at points A and B are the same. At point D the voltage wave form is of the same frequency but opposite in direction compared to point A. Similarly, at point E the current wave form is of the same frequency but opposite in direction compared to the current wave form at point B.

In operation, a current signal applied by the transmitter to the input terminals 18, 19 of the isolator charges its capacitor 73 and creates a potential difference across its diodes 49, 50 and 51. That potential, for example, of 2 volts, starts the master oscillator 53 and causes it to produce a 50% duty cycle square wave on the primary winding 46. That square wave induces a corresponding square wave, of the same frequency, across the secondary winding 60 which is applied to the base-emitter junctions of transistors 64 and 69, turning them on and off in an alternative push-pull relationship. The switching on-off action of transistors 64 and 69 chops the input current at the rate determined by the master oscillator 53. The input current is applied, in opposite directions, at alternative half-cycles to the two halves of the primary winding 75 of the current transformer 76. The current thereby induced in the secondary winding 85 is rectified by diodes 86, 87 and filtered by capacitor 90.

The current transformer 76 establishes the current-to-current ratio. For example, if the ratio of input current to output current of the isolator is desired to be one-to-one, then the number of turns in the primary winding 75 will be equal to the number of turns in the secondary winding 85. However, other ratios between the primary and secondary windings may be utilized to provide other scale factors, for example, by changing the turns ratio the isolator may accept from different transmitters inputs of 10 to 50 milliamps, or 4 to 20 milliamps, or 1 to 5 milliamps. In the case of an input of 1 to 5 the current-to-current isolator may provide an output of 4 to 20 milliamps and in the case of 4–20 milliamps input it may provide an output of 10 to 50 milliamps. In the case of 1 to 5 milliamps input it may provide an output of 4 to 20 milliamps.

It will be understood, however, that generally the isolator will be used with a one-to-one ratio and that both the input and the output will be 4 to 20 milliamps.

The current-to-current isolator of the present invention presents numerous advantages compared to the externally powered current-to-current isolators conventionally utilized at the present time. The most important advantage is that it is self-powered and consequently avoids the expense and inconvenience of connection to an exterior power source. It utilizes very little power, no more than 12 milliwatts, and adds a maximum input voltage drop of 3 volts when driving an output impedance of up to 300 ohms. In addition, since it is self-powered, it does not require a power supply regulator or other relatively expensive and cumbersome and complex circuitry which would be required to convert the external power source to be utilized in the isolator. The current-to-current isolator is of a highly compact size, for example, it may be only 7 cubic inches in volume and weigh only one ounce. It provides a linearity as between input and output current which is 0.05% so that its signal may be relied upon as fully and accurately representing the signal as received from the transmitter. Similarly, its repeatability is 0.05% or better and it is not adversely affected by long-term aging or by short-term effects such as temperature. Both the long-term aging and the short-term temperature would primarily affect the duty cycle of the modulators and those duty cycles are by no means critical to the overall accuracy of the isolator.

Modifications may be made in the present invention within the scope of the subjoined claims. For example, the slave oscillator of the preferred embodiment described above is a push-pull oscillator. An alternative, but not preferred, is to operate single-ended, i.e., without push-pull, which would result in about a 50% loss of energy. Since the isolator is self-powered, that amount of lost energy would generally not be acceptable. In addition, in such single-end operation the changes in reflected impedance that is, the changes in impedance if the isolator as viewed by the transmitter, may adversely affect the accuracy of the transmitter.

As another alternative, the slave oscillator may be made self-oscillating instead of operating under the control of the master oscillator. The change of signal, for example, from the standard 4 milliamp level, would start the self-oscillation of the circuit. This alternative would be, it is believed, less accurate in linearity and repetitiveness than the preferred embodiment.

The duty cycle of the preferred embodiment is 50%. If the duty cycle is appreciably more or less than 50%, some inaccuracies may be introduced, particularly if the hysteresis curve of the current transformer is not equally balanced. In addition, any variation from the 50% duty cycle would increase the output ripple, which could, however, be prevented by additional output filter components. The 50% duty cycle, consequently, is the preferred embodiment.

What is claimed is:

1. A current-to-current isolator adapted to be utilized between a transmitter and a control room instrument and to be powered by the current signal from the transmitter and without another power source, said isolator comprising:
    a pair of input terminals and a pair of output terminals;
    a master oscillator means which is a push-pull chopper and connected to the first input terminal;
    a first transformer whose primary winding has a center tap and two end taps;
    a voltage reference means providing a voltage drop connected between said first input terminal and said center tap, the said center tap and the said taps being connected to said master oscillator;
    a slave oscillator means connected to the secondary of said first transformer and whose frequency is controlled by said master oscillator;
    a current transformer whose primary winding has a center tap and two end taps, said center tap being connected to the second input terminal and the end taps being connected to said slave oscillator means; and
    full wave rectifying and filtering means being connected between the secondary of said current transformer and said output terminals.

2. A current-to-current isolator as in claim 1 wherein said master oscillator means is a free-running astable multivibrator which operates using the primary winding of said first transformer and has an about 50% duty cycle.

3. A current-to-current isolator as in claim 1 wherein said voltage reference means is a series of diodes.

4. A DC-current to DC-current isolator which is self-powered, including two input terminals to be connected to a transmitter and two output terminals to be connected to a control room instrument, a master oscillator which is a multivibrator, a slave oscillator connected to an input terminal, the frequency of said slave oscillator being controlled by the master oscillator, a current transformer whose primary winding is operatively part of said slave oscillator, voltage reference means for obtaining a voltage drop connected between an input terminal and said two oscillators, and rectifying means connected to the secondary winding of the current transformer to rectify its current, said output terminals being connected to said rectifying means.

5. An isolator as in claim 4 in which said voltage reference means is a series of diodes.

6. A DC-current to DC-current isolator which is a four terminal device having two input terminals and two output terminals and which is self-powered by the input signal and which carries a variable information input signal from a transmitter to a control room instrument, said isolator including two input terminals to be connected to the transmitter and two output terminals to be connected to the control room instrument, master oscillator means which is a multivibrator, a slave oscillator means connected to an input terminal and which chops said input signal into positive and negative directed waveforms, the frequency of said slave oscillator means being controlled by the master oscillator, a first transformer having a primary winding and a secondary winding and whose primary winding is operatively part of said master oscillator means and whose secondary winding is operatively part of said slave oscillator means, a current transformer whose primary winding is operatively part of said slave oscillator, and rectifying means connected to the secondary winding of the said current transformer to rectify its current, said output terminals being connected to said rectifying means.

7. An isolator as in claim 6 in which said slave oscillator is a push-pull oscillator and wherein the primary winding of said current transformer has three taps a center one of which taps is directly connected to one of said input terminals.

* * * * *